(12) United States Patent
Krishnaswamy et al.

(10) Patent No.: US 9,369,338 B1
(45) Date of Patent: Jun. 14, 2016

(54) NETWORK LINK CAPACITY DETERMINATION

(71) Applicant: Google Inc., Mountain View, CA (US)

(72) Inventors: Rajesh Krishnaswamy, Sunnyvale, CA (US); Michael Alex Frumkin, Los Altos, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 14/143,593

(22) Filed: Dec. 30, 2013

(51) Int. Cl.
*H04L 12/28* (2006.01)
*H04L 12/24* (2006.01)

(52) U.S. Cl.
CPC ........ *H04L 41/0668* (2013.01); *H04L 41/0672* (2013.01)

(58) Field of Classification Search
CPC ......... H04L 45/00; H04L 45/28; H04L 45/22; H04L 41/06; H04L 41/0816
USPC ......... 370/221, 232, 236, 238, 252, 254, 255; 709/238, 241
See application file for complete search history.

(56) References Cited

U.S. PATENT DOCUMENTS

| | | | | |
|---|---|---|---|---|
| 6,256,295 B1 * | 7/2001 | Callon | ................ | H04L 49/3081 370/254 |
| 6,909,700 B1 * | 6/2005 | Benmohamed | ....... | H04L 41/145 370/231 |
| 7,230,924 B2 | 6/2007 | Chiu et al. | | |
| 7,859,993 B1 * | 12/2010 | Choudhury | ......... | H04L 41/0681 370/217 |
| 8,005,111 B2 | 8/2011 | Lauther | | |
| 8,477,629 B2 | 7/2013 | Vasseur et al. | | |
| 2012/0137021 A1 * | 5/2012 | Chiueh | ................ | H04L 47/125 709/241 |

OTHER PUBLICATIONS

Macgregor, M. H. and Grover, W. D. "Optimized k-shortest-paths Algorithm for Facility Restoration." Software-Practice and Experience, vol. 26 (9). Sep. 1994, pp. 823-834.
Pollack, M. "Letter to the Editor—The kth Best Route Through a Network." Operations Research vol. 9(4). © 1961, pp. 578-580. Retrieved from: <http://dx.doi.org/10.1287/opre.9.4.578>.
Yen, J. Y. "Finding the K Shortest Loopless Paths in a Network." Management Science, vol. 17(11), Theory Series. Jul. 1971, pp. 712-716. Retrieved from: <http://www.jstor.org/stable/2629312>.
Dunn, D. A. et al. "Comparison of k-Shortest Paths and Maximum Flow Routing for Network Facility Restoration." IEEE Journal on Selected Areas in Communications, vol. 12(1). Jan. 1994, pp. 88-99.
Ahuja, R. K. et al. "Network Flows: Theory, Algorithms and Applications," Prentice Hall. © 1993, pp. 294-298, 320-324.
"Constrained Shortest Path First" [online], <en.wikipedia.org/wiki/constrained_shortest_path_first>, Dec. 13, 2013, 2 pages.
"Teletraffic Engineering", [online], <en.wikipedia.org/wiki/teletraffic_engineering>, Dec. 13, 2013, 3 pages.

* cited by examiner

*Primary Examiner* — Charles C Jiang
*Assistant Examiner* — Wali Butt
(74) *Attorney, Agent, or Firm* — Edward A. Gordon; Foley & Lardner LLP

(57) ABSTRACT

A system and method is provided for identifying network links for augmentation based on potential link failures. In one aspect, the links are selected by identifying multiple shortest paths between a node pair and generating augmentation recommendations for a single link by accumulating recommendations based on multiple node pairs.

12 Claims, 9 Drawing Sheets

NETWORK LINK CAPACITY DETERMINATION

BACKGROUND

The capacity of individual links in a network may be selected to meet expected traffic demand. The capacity may further be selected to increase the fault tolerance of the network in the event one or more links fail. By way of example, the network may be configured so that the network can continue meeting the data traffic demands between a source node and a destination node if one of the links of the networks becomes unavailable for use.

In that regard, the capacity of existing links may be augmented in anticipation of, or in response to, a failure in the network. For instance, augmentation of the maximum capacity of the links of the network may be performed in anticipation of each failure topology. Links to be so augmented may be identified with the aid of an algorithm such as a constrained shortest path first (CSPF) algorithm. Augmentation may be performed by dispatching personnel to modify the physical networking infrastructure, for example, laying additional fiber optic cables, adding additional network communication devices, or increasing the capacity of an existing communication device. Augmentation may also be performed by reconfiguring the network communication devices to, for example, increase the network bandwidth allocated to the selected link.

BRIEF SUMMARY

In one aspect, a method of determining a capacity for links of a communication network is provided. The method may identify, with a processor, a first subset of links and a second subset of links, the first subset of links including the links on the shortest path between a first source node and a first destination node, and the second subset of links including the links on the shortest path between the first source node and the first destination node that do not include any link within the first subset. The method may also identify, with a processor, a third subset of links and a fourth subset of links, the third subset of links including the links on the shortest path between a second source node and a second destination node, the fourth subset of links including the links on the shortest path between the second source node and the second destination node that do not include any link within the third subset, and at least one of the second source node and second destination node being different than at least one of the first source node and the first destination node. The method may further determine a cumulative demand capacity of a link by adding a first demand capacity to each link in the first and second subset, the first demand capacity being the demand capacity between the first source node and the first destination node. The method may also add a second demand capacity to each link in the third and fourth subset, the second demand capacity being the demand capacity between the second source node and the second destination node.

In another aspect, a system is provided that includes one or more processors and a memory coupled to the one or more processors. The memory includes instructions capable of causing the one or more processors to identify a first subset of links and a second subset of links, the first subset of links including the links on the shortest path between a first source node and a first destination node, and the second subset of links including the links on the shortest path between the first source node and the first destination node that do not include any link within the first subset. The instructions may also include identifying a third subset of links and a fourth subset of links, the third subset of links including the links on the shortest path between a second source node and a second destination node, the fourth subset of links including the links on the shortest path between the second source node and the second destination node that do not include any link within the third subset, and at least one of the second source node and second destination node being different than at least one of the first source node and the first destination node. The instructions may further include determining a cumulative demand capacity of a link by adding a first demand capacity to each link in the first and second subset, the first demand capacity being the demand capacity between the first source node and the first destination node. The instructions may also adding second demand capacity to each link in the third and fourth subset, the second demand capacity being the demand capacity between the second source node and the second destination node.

In still another aspect, a method of adding capacity to links of a communication network, where each link has a capacity, includes: determining, with a processor, for each of a plurality of different node pairs in the network, a first set of links collectively providing the greatest capacity between the two nodes of the pair and a second set of links collectively providing the second greatest capacity between the two nodes of the pair, such that none of the links in the second set are included in the first set; determining, with a processor, for each of the plurality of node pairs for which a first and second set of links was determined and for each link in such first and second sets, a capacity to be added to the current capacity of each link based on a predetermined capacity associated with the node pair; and adding capacity to a plurality of links in the network based on the capacity to be added determined for the link.

DETAILED DESCRIPTION

In one aspect, individual links of a network may be selected for augmentation to mitigate the potential of decreased performance in the event of a link failure. For example, the network may be represented by a data structure such as a directed graph with link costs and a set of demand capacities, where the nodes and edges represent the physical or logical communication network. In some aspects, the nodes may represent data centers or server clusters major cities and the edges may represent network links between them. The set of demand capacities may represent the amount of bandwidth required between each pair of nodes.

A system may identify links for augmentation by first computing the shortest path between a source and destination node (e.g., San Francisco and New York). The processor may then compute a second shortest path, but in doing so may exclude any edge used by the first shortest path. Once the first and second shortest paths have been determined, the processor may add the demand capacity of the node pair to each edge in the first and second shortest path. The processor may also iterate through multiple high-value node pairs, e.g., it may analyze links to the top ten cities. Each a different node-pair is analyzed, the system may accumulate the demand capacity of each link selected for augmentation. The accumulated demand capacities may be compared to the current capacities of the network, and the network may be physically or logically modified in order to meet the potential demand.

Figure 1:
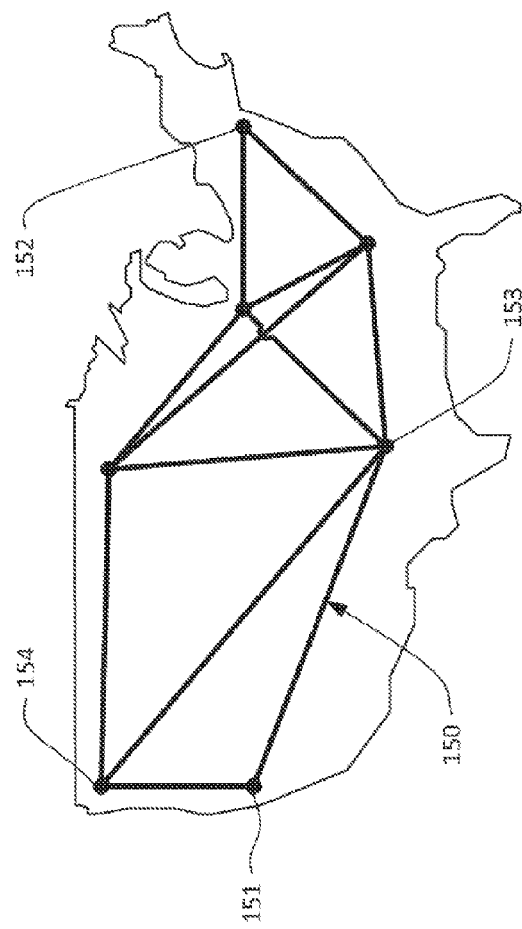
FIG. 1 is a functional diagram of a system in accordance with aspects of the disclosure.
Figure 1:
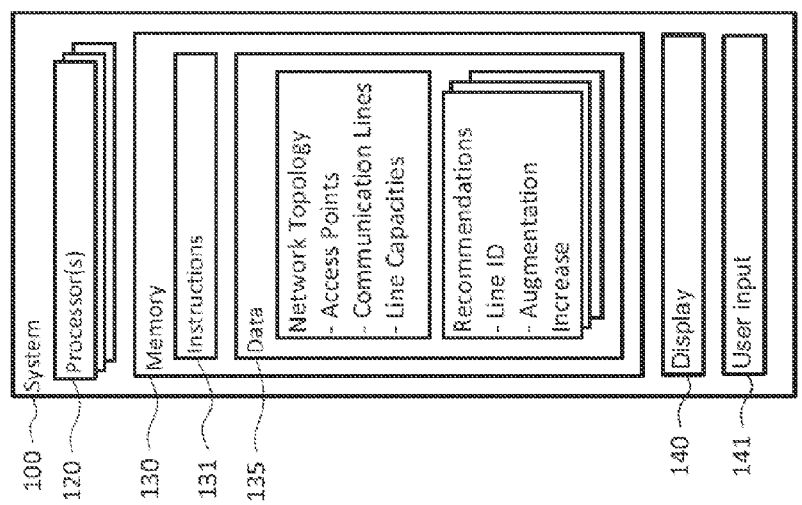

FIG. 1 illustrates one possible system 100 in which the aspects disclosed herein may be implemented. System 100 may be a computing device containing one or more processors 120, memory 130 and other components typically present in general purpose computing devices. Although FIG. 1 functionally represents processors 120 and memory 130 as a single block within system 100, which is also represented as a single block, the system may include and the methods described herein may involve multiple processors, memories and devices that may or may not be stored within the same physical housing.

Memory 130 of computing device 110 may store information accessible by processor 120, including instructions 131 that may be executed by the processor 120. Memory 130 may also include data 135 that may be retrieved, manipulated or stored by processor 120. Memory 130 and the other memories described herein may be any type of storage capable of storing information accessible by the relevant processor, such as a hard-disk drive, a solid state drive, a memory card, RAM, DVD, write-capable memory or read-only memory. In addition, the memory may include a distributed storage system where data, such as data 135, is stored on a plurality of different storage devices which may be physically located at the same or different geographic locations.

The instructions 131 may be any set of instructions to be executed by processor 120 or other computing device. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 120 may be any conventional processor, such as a commercially available CPU. Alternatively, the processor may be a dedicated component such as an ASIC or other hardware-based processor.

Data 140 may be retrieved, stored or modified by computing device 100 in accordance with the instructions 131. The data may comprise any information sufficient to identify the relevant information, such as numbers, descriptive text, proprietary codes, pointers, references to data stored in other memories such as at other network locations, or information that is used by a function to calculate the relevant data.

The system may also include components normally used in connection with a personal computing device such as a display 140 (e.g., a monitor having a screen, a touch-screen, a projector, a television, or other device that is operable to display information), and user input device 141 (e.g., a mouse, keyboard, touch-screen, microphone, etc.).

System 100 may store a representation of the topology of a network. For example, the system may store a list of network nodes and a list of the links connecting one of those network nodes to another network node. The nodes may be a logical representation of, for example, a physical device or collection of devices (e.g., communication facility, data center, access point, etc.). The links may represent high capacity data communication lines. For example and ease of discussion, FIG. 1 illustrates a high-capacity network 150 directly and indirectly connecting facilities that are geographically dispersed (e.g., different cities). By way of example, a facility 151 located in San Francisco may have a data connection with a facility 153 in Dallas, and may be indirectly connected to a facility 152 located in New York.

Different lines between network nodes may have different capacities for data traffic, and the system's memory may store information related to those differences. For instance, the data connection between network node 151 and network node 153 may be capable of transmitting five times as much data per second, on average, than data connection between network node 151 and network node 154. The difference in capacity between any node pair may reflect any number of factors including, by way of example only, the geographic distance between the points and the amount of individual fiber optic lines connecting the two points. The capacity may also depend on allocation preferences, e.g., the entity that owns the connection may agree to devote a portion of the total bandwidth for a particular use, such as for use by one or more other entities. Moreover, each data connection may itself be implemented by a network, in which case the capacity of the data connection may depend on the collective capacity of the constituent parts of that network.

Figure 2:
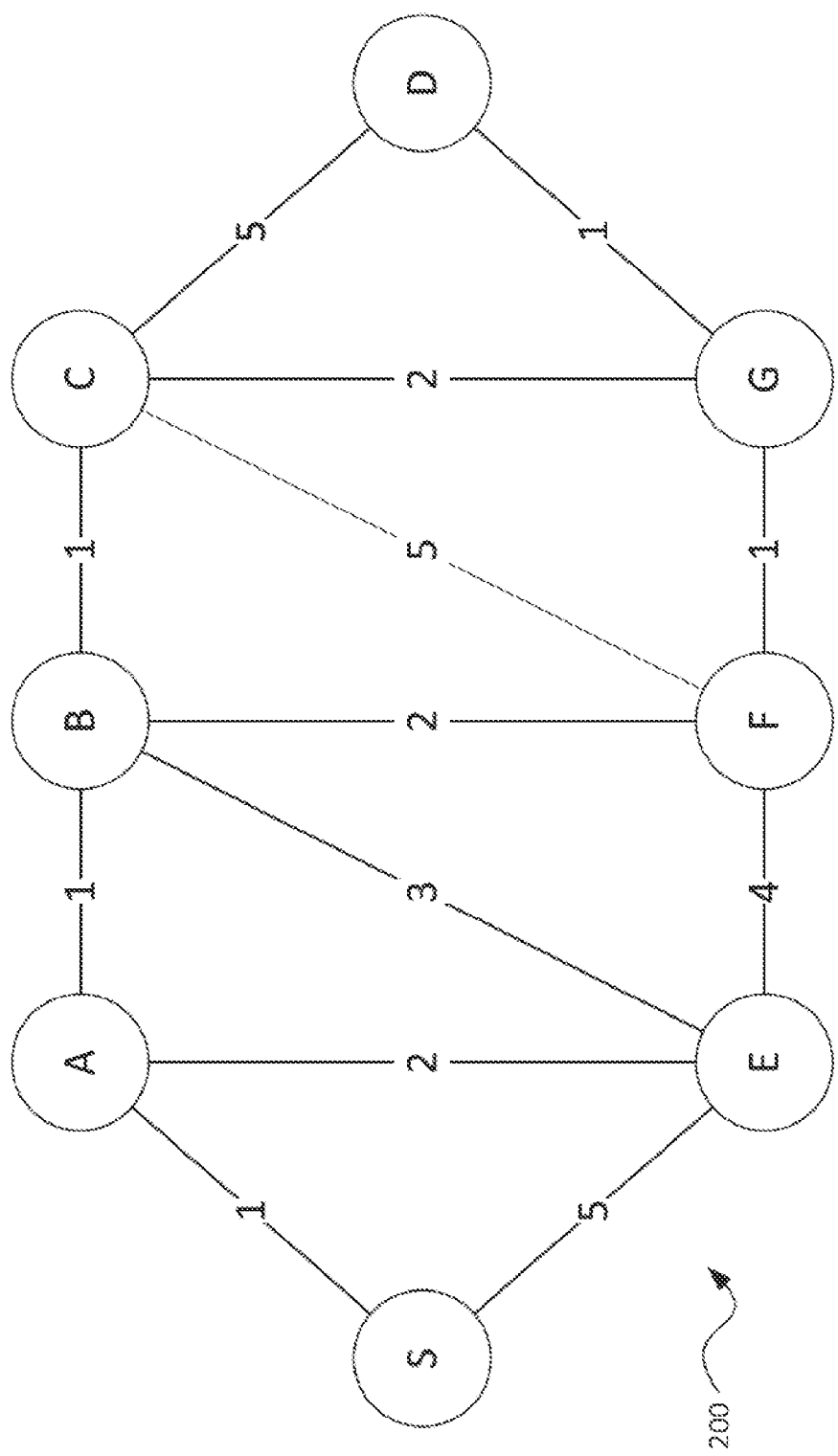
FIG. 2 is a graph showing an example of a network topology in accordance with aspects of the disclosure.

The information stored about the network may functionally take the form of a graph, such as graph 200 shown in FIG. 2. Each node A-G and S may represent an access point and each line (also referred to herein as an edge) between the nodes may represent a data connection there between. The number associated with each edge (the edge's weight) may be based on the traversal cost, geographic distance, or relative capacity of the data connection between the two points. By way of example, the capacity of the fastest line may be assigned a lower value to reflect that it would take less time for data to travel between those nodes. The value associated with the other lines may be based on how much longer or shorter it would take to send the same amount of data. The larger the weight the longer duration of time (e.g., cost) required to send data from one point to the other. Thus, based on graph 200, the data connection associated with edge S-A is faster than the data connection associated with edge E-A and significantly faster than the data connection associated with edge S-E.

Figure 9:
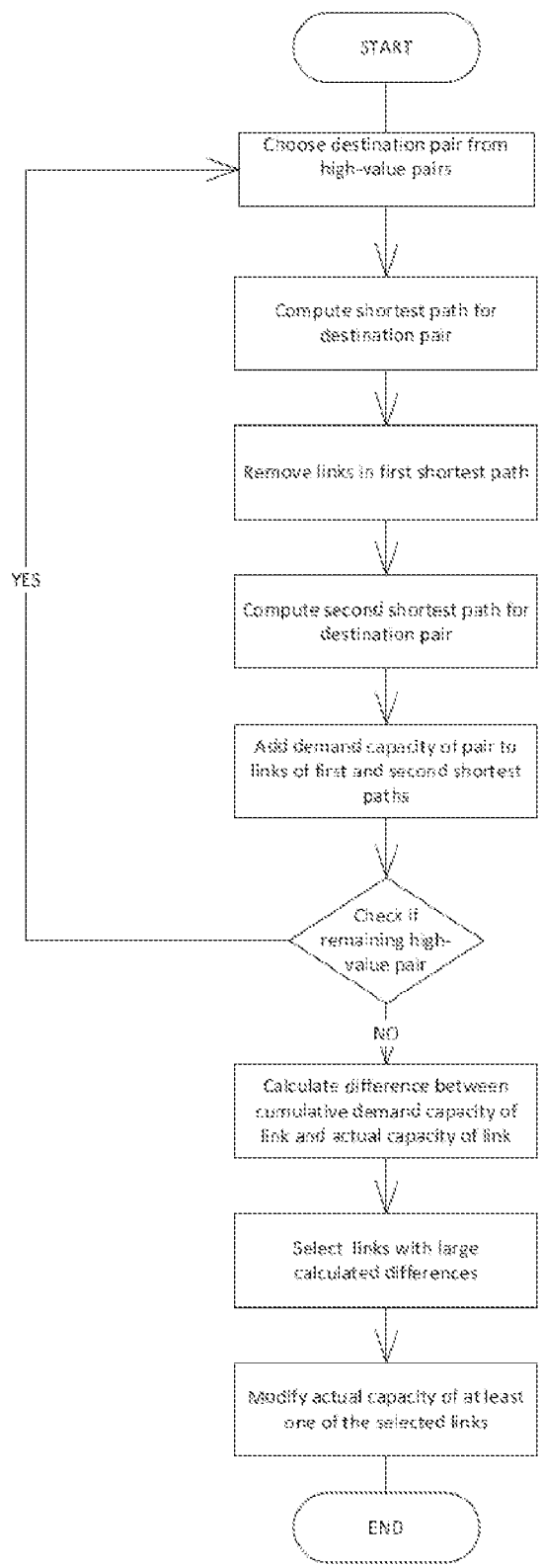
FIG. 9 is an example flow diagram in accordance with aspects of the disclosure.

In addition to the operations illustrated in FIG. 9, various operations in accordance with a variety of aspects of the invention will now be described. It should be understood that the following operations do not have to be performed in the precise order described below. Rather, various steps can be handled in reverse order or simultaneously.

In one aspect, the system may identify a change to the capacity of one or more data connections in order to increase the overall network's fault tolerance.

The system may detect which connection to augment by analyzing all or a portion of the possible source-destination node pairs. If a portion of all-possible pairs are used, the pairs may be selected based on their relative value to the network, e.g., based on criteria such as quantity of bandwidth consumed or importance of devices located at a particular node. In one example, the high-value node pairs may comprise network facilities or data centers located at major cities.

Figure 3:
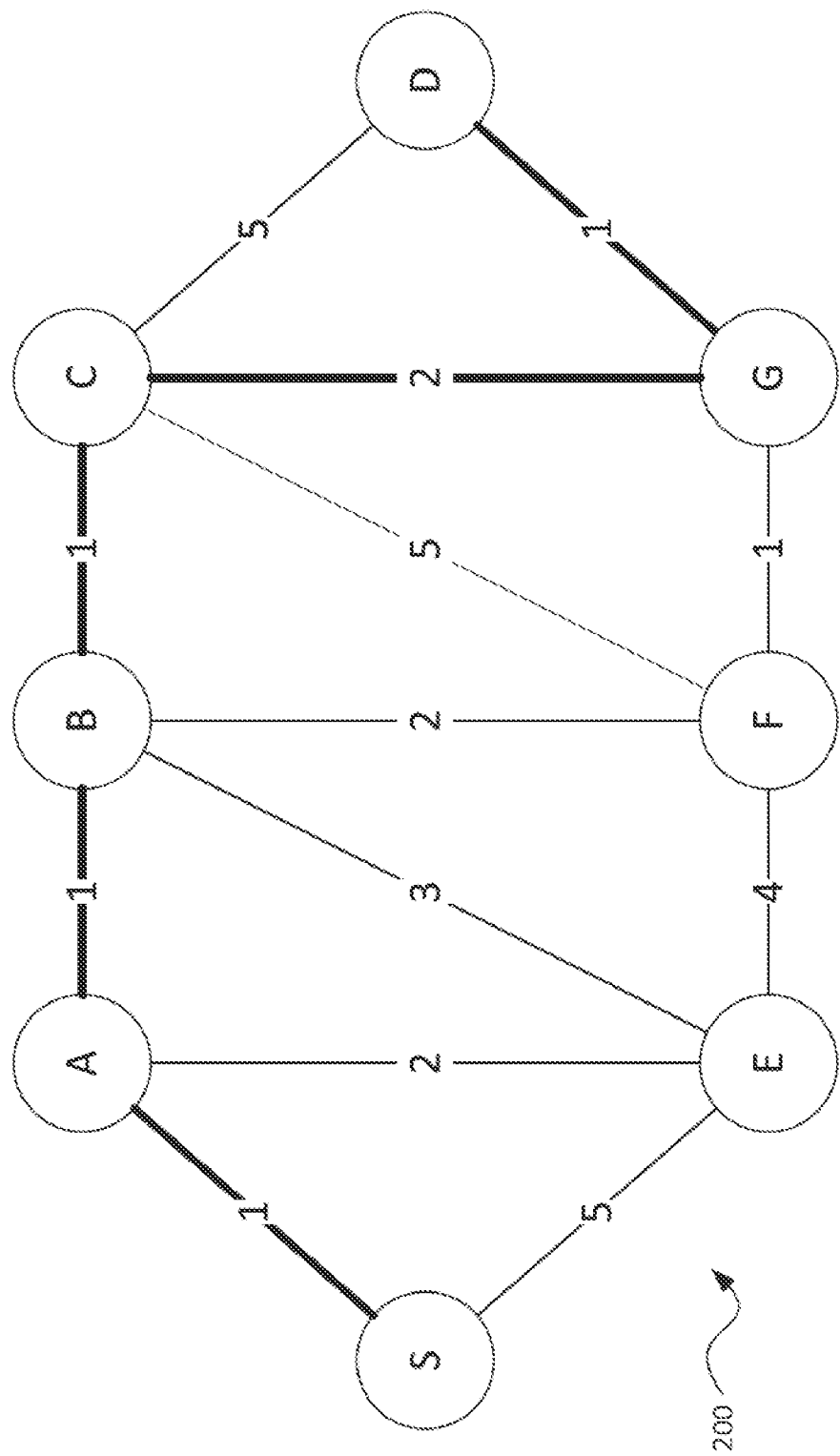
FIG. 3 is a graph of a network topology in accordance with aspects of the disclosure and based on the example graph of FIG. 2.

Once a node pair is selected the system may then determine the shortest path between the source and the destination node of a selected pair. For instance, the processor 120 may use a shortest-path algorithm, such as but not limited to Dijkstra's algorithm, the Bellman-Ford algorithm, or the Floyd-Warshall algorithm to determine the shortest path from node S to node D in view of the weights of the edges. In that regard, as shown in FIG. 3, the processor would determine that the shortest path from node S to node D in graph 200 is S-A-B-C-G-D, having a cumulative weight of 6.

Figure 4:
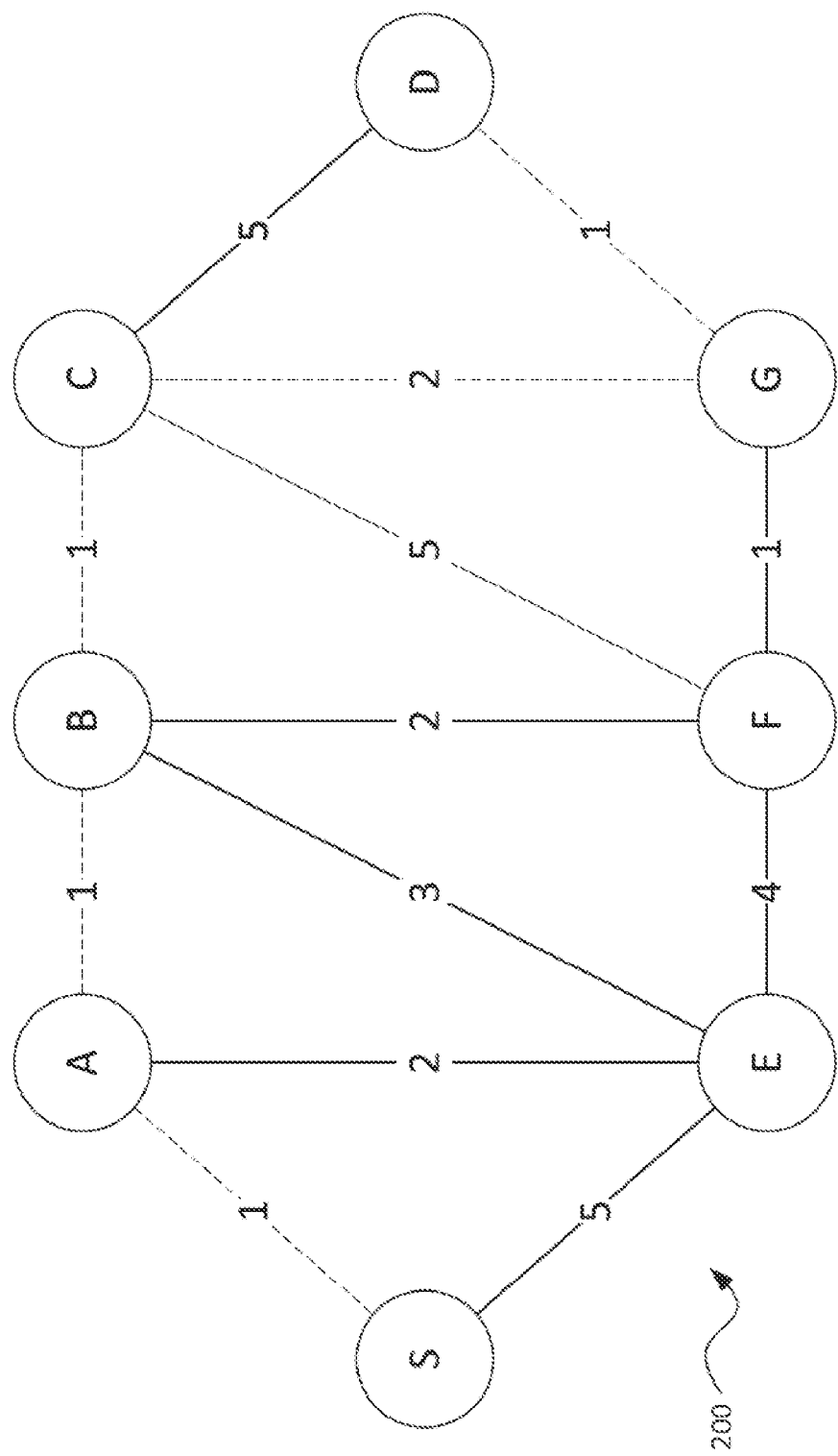
FIG. 4 is a graph of a network topology in accordance with aspects of the disclosure and based on the example graph of FIG. 2.
Figure 5:
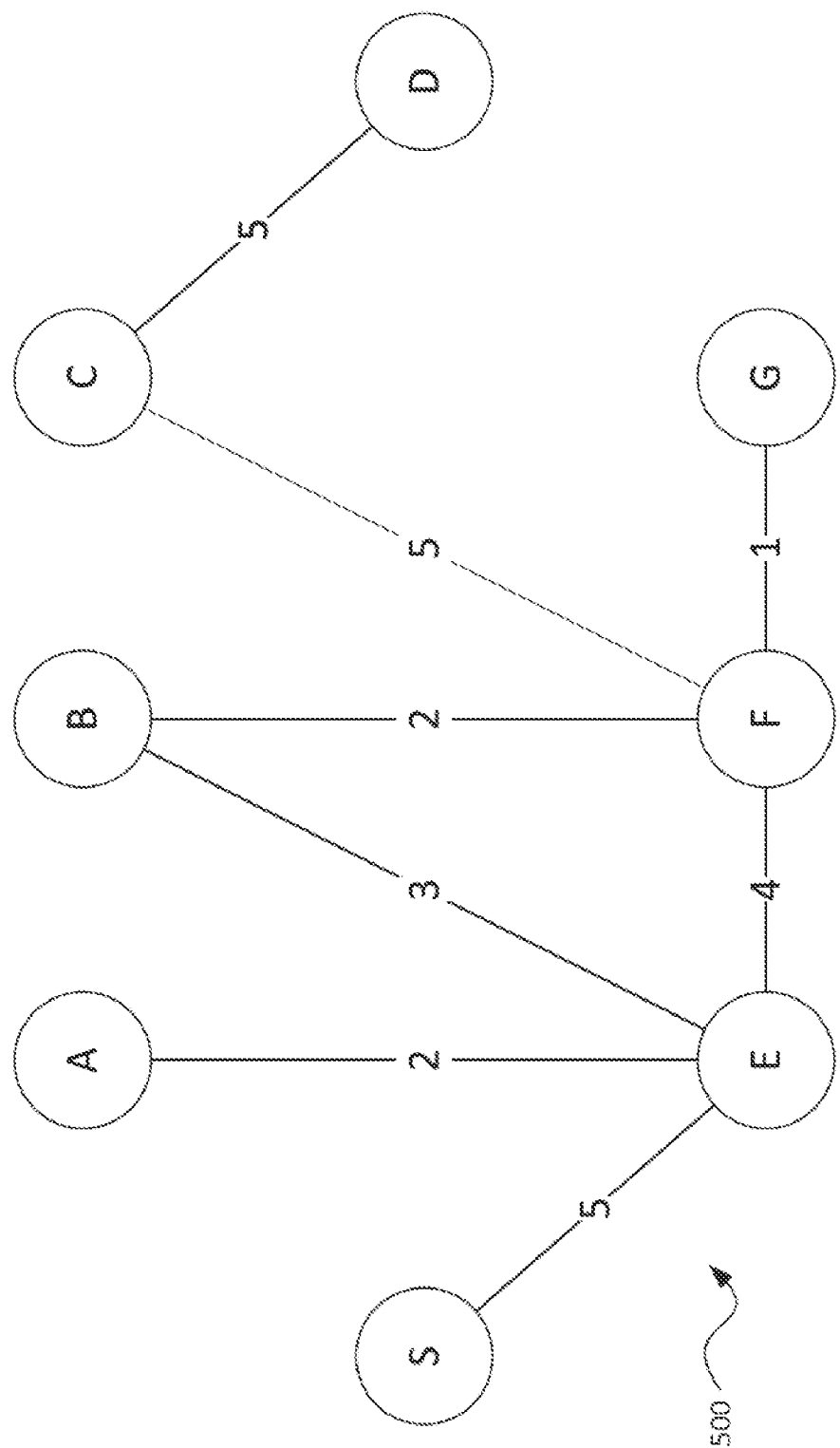
FIG. 5 is a graph of a network topology in accordance with aspects of the disclosure and based on the example graph of FIG. 2.

The system may then modify the data structure representing the graph to remove the edges of the previously determined shortest path. Removing edges may include deleting the edge from the available list of edges or may include modifying the weight of the edge to be a prohibitively high value, such as infinity or some other value that would result in the link being avoided as a possible candidate for the shortest path. For example, as shown in dashed lines in FIG. 4, the system may identify the edges along path S-A-B-C-G-D, and remove those edges. As shown in FIG. 5, the result is a residual graph 500 that is functionally different from original graph 200.

Figure 6:
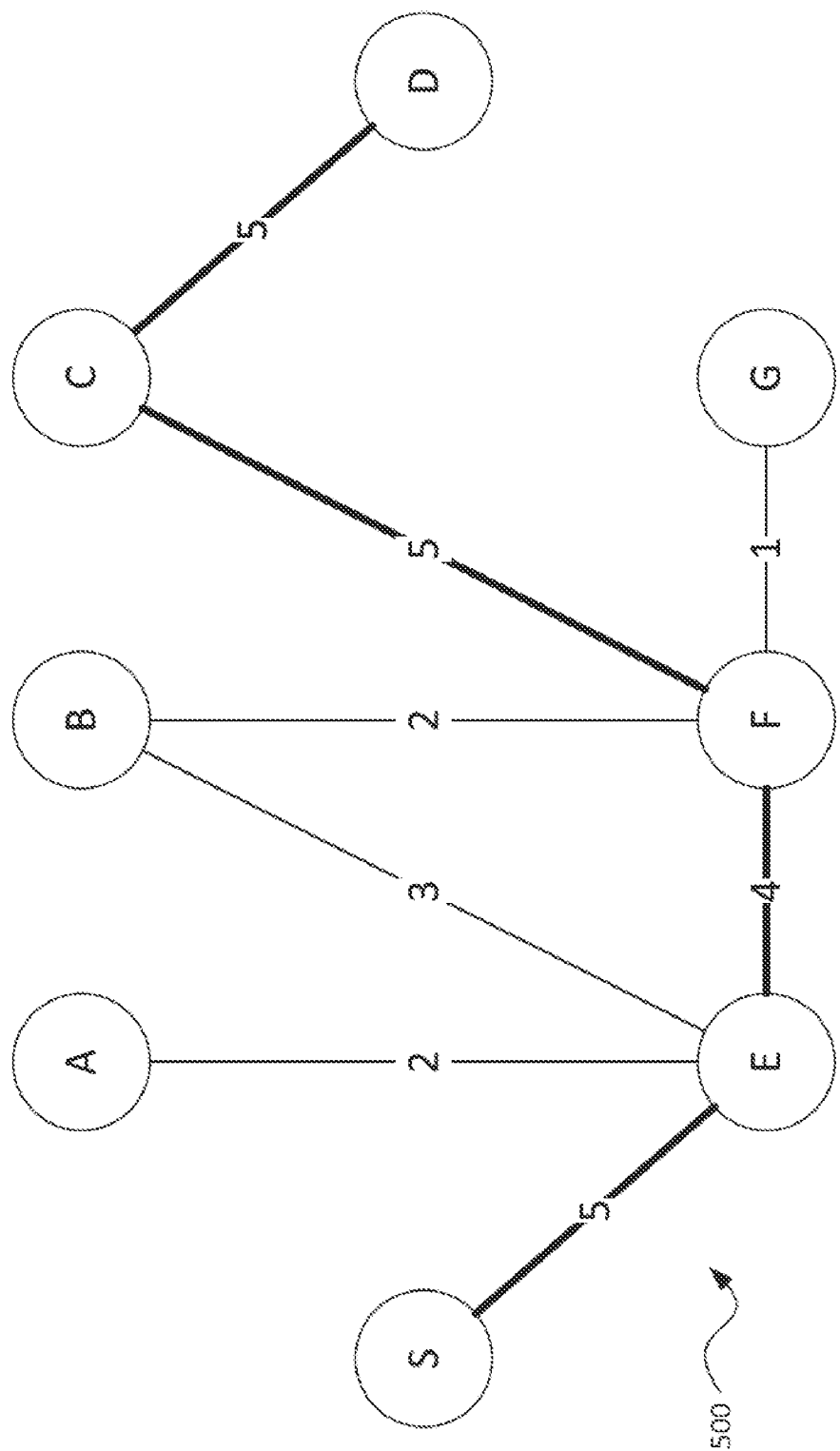
FIG. 6 is a graph of a network topology in accordance with aspects of the disclosure and based on the example graph of FIG. 2.

After the edges of the previously-identified shortest path have been removed from the graph, the system may determine the shortest path between the source and the destination node pair based on the remaining edges in the data structure (e.g., residual graph). For example, as shown in FIG. 6, the processor 120 may use a shortest-path algorithm to determine that the shortest path from node S to D in residual graph 500 is S-E-F-C-D, having a cumulative weight of 19. The shortest path in the residual graph is effectively a second or subsequent shortest path that shares no links with the first shortest path. The algorithm used to determine the shortest path in the residual graph may be the same algorithm used to determine the first shortest path or it may be a different algorithm.

Figure 7:
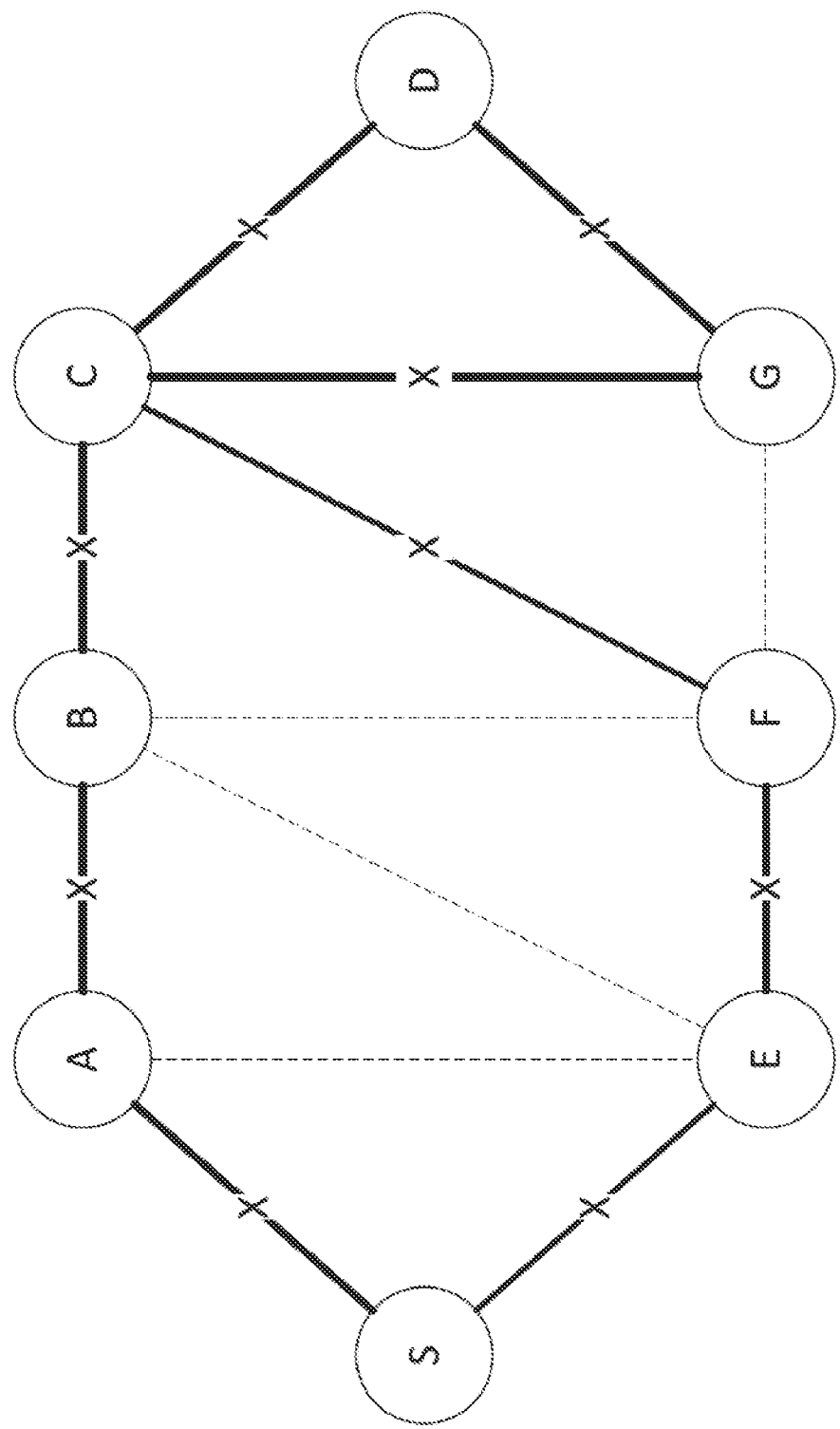
FIG. 7 is a graph of a network topology in accordance with aspects of the disclosure and based on the example graph of FIG. 2.

After determining the two shortest paths as described above, the system may attribute the demand capacity of the node pair to each link (e.g., edge) in the first and second shortest paths. The demand capacity may be based on historical bandwidth measurements such as the average bandwidth and/or peak bandwidth over a duration of time. The demand capacity may also or alternatively be based on predicting or forecasting future bandwidth requirements, such as based on historical trends or extrapolation based on known future events. For example, as shown in FIG. 7, the system may associate the demand capacity of the node pair with the edges designated as "X" (S-A, A-B, C-D, S-E, E-F, F-C, C-G, G-D).

The foregoing process may be repeated for some or all of the possible node pairs (e.g., high-value pairs), as discussed above. For instance, after identifying the links to augment based on node S as the source node and node D as the destination node, the system may identify the links to augment based on node A as the source node and node D as the destination node, node B as the source node and node E as the destination node, etc.

A single link may be selected for augmentation based on multiple different source-destination node pairs. The system may use all or a portion of the 56 possible pairs of source-destination nodes in graph 200 to identify potential links for augmentation. In one aspect, the fact that a link is selected multiple times for augmentation has no effect on the system's augmentation recommendations. In another aspect, the system may rank augmentation recommendations based on how many different source-destination node pairs resulted in a link being selected. For example, if link S-A was selected many more times than link S-E, the system may rank link S-A higher in its list of recommendations than link S-E. In yet another aspect, the number of times the link was selected is one of a plurality of factors used to rank each link, e.g., ranking priority may be based on both the number of times the link was selected and the expected cost of augmenting the link. In another example, both the quantity of times a link is selected and the demand capacity of each node pair are used to identify links for augmentation. In this example, each time the system iterates through a node pair it will attribute the demand capacity of the node pair to each link of the respective two shortest paths. When the demand capacities of multiple node pairs are attributed to the same link the demand capacities may be added to produce the cumulative demand capacity of the link.

Once the system has completed iterating through the node pairs, it may compare the cumulative demand capacity of each link to the current capacity of the corresponding network link to determine which links have a cumulative demand capacity that exceeds its current capacity and may need augmenting. The system may then quantify the amount of augmentation necessary, for example to increase bandwidth by 500 gigabits per second. This may be done by sorting the links based on the size of the difference (e.g., delta) between the cumulative demand capacity and current capacity. The system may then flag a portion of the links that have the largest delta.

Figure 8:
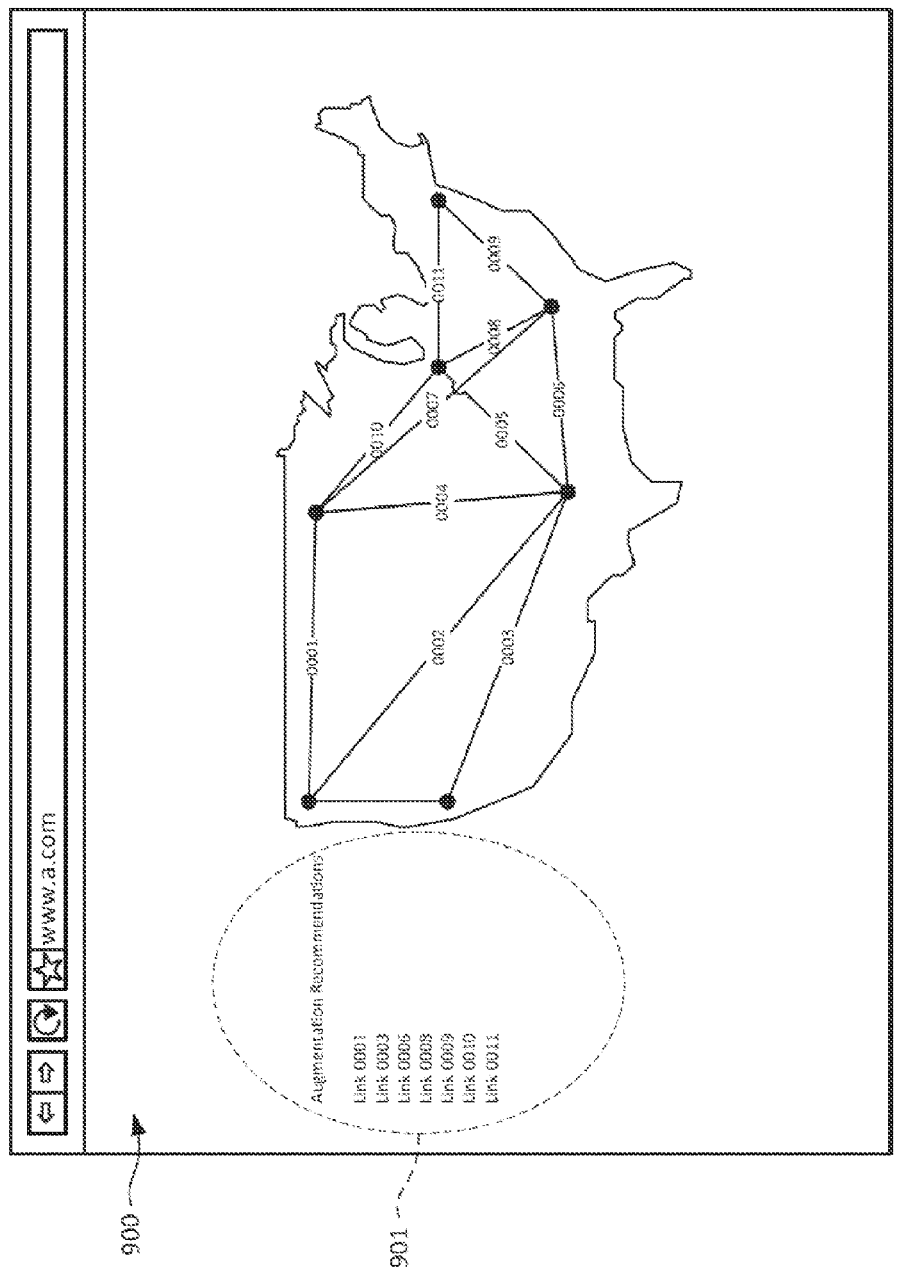
FIG. 8 is a sample screen in accordance with aspects of the disclosure.

The augmentation recommendations calculated by the system may be implemented manually and automatically. This may include dispatching personnel to modify the physical networking infrastructure, for example, laying additional fiber optic cables, adding additional network communication devices, or increasing the capacity of an existing communication device. This may also be done by reconfiguring the network communication devices to, for example, increase the network bandwidth allocated to the selected link. By way of example, FIG. 8 is an example of a screen shot 900 that includes a list 901 of the links that are recommended for augmentation, and may be displayed on display 140 of system 100. In response, the links may be augmented such as by increasing their physical capacity or allocating bandwidth. In another aspect, the system 100 may be capable of transmitting the requested changes to the network nodes of network 150 that are connected to links to be augmented. To the extent they can do so, the nodes may automatically increase the bandwidth to accommodate the requested changes, e.g., by reallocating bandwidth on the relevant links.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of determining a capacity for a plurality of links of a communication network, comprising:

identifying, with a processor, a first subset of links and a second subset of links, the first subset of links including the links on the shortest path between a first source node and a first destination node, and the second subset of links including the links on the shortest path between the first source node and the first destination node that do not include any link within the first subset;

identifying, with a processor, a third subset of links and a fourth subset of links, the third subset of links including the links on the shortest path between a second source node and a second destination node, the fourth subset of links including the links on the shortest path between the second source node and the second destination node that do not include any link within the third subset, and at least one of the second source node and the second destination node being different than at least one of the first source node and the first destination node; and determining a cumulative demand capacity of each of the plurality of links by:
adding a first demand capacity to each link in the first and second subset, the first demand capacity being the demand capacity between the first source node and the first destination node; and
adding a second demand capacity to each link in the third and fourth subset, the second demand capacity being the demand capacity between the second source node and the second destination node;

identifying a first link of the plurality of links for augmentation after determining a cumulative demand capacity of the first link; and augmenting a capacity of the first link by reconfiguring a network communication device that allocates capacity to the first link.

2. The method of claim 1, wherein identifying a link comprises comparing the determined cumulative demand capacity of a link to the current capacity of the link.

3. The method of claim 2 further comprising displaying an identification of the identified link on an electronic display.

4. The method of claim 1, wherein the first and second demand capacities are network bandwidth capacities based on historical network bandwidth use.

5. The method of claim 1, wherein identifying the first subset of links involves executing a shortest path algorithm selected from the group consisting of Dijkstra's algorithm, Bellman-Ford algorithm, and Floyd-Warshall algorithm.

6. The method of claim 1, wherein identifying the first subset of links includes:
using a data structure having a plurality of nodes and plurality of edges, at least one edge corresponding to a physical network link; and
modifying the data structure to remove each edge corresponding to the first subset of links.

7. A system for determining a capacity for a plurality of links of a communication network, comprising:
one or more processors;
a network communication device that allocates capacity of the links; and
a memory coupled to the one or more processors, the memory including instructions capable of causing the one or more processors to:
identify a first subset of links and a second subset of links, the first subset of links including the links on the shortest path between a first source node and a first destination node, and the second subset of links including the links on the shortest path between the first source node and the first destination node that do not include any link within the first subset;
identify a third subset of links and a fourth subset of links, the third subset of links including the links on the shortest path between a second source node and a second destination node, the fourth subset of links including the links on the shortest path between the second source node and the second destination node that do not include any link within the third subset, and at least one of the second source node and the second destination node being different than at least one of the first source node and the first destination node;
determine a cumulative demand capacity of each of the plurality of links by:
adding a first demand capacity to each link in the first and second subset, the first demand capacity being the demand capacity between the first source node and the first destination node; and
adding a second demand capacity to each link in the third and fourth subset, the second demand capacity being the demand capacity between the second source node and the second destination node;
identifying a first link of the plurality of links for augmentation after determining a cumulative demand capacity of the first link; and
augmenting a capacity of the first link by reconfiguring a network communication device that allocates capacity to the first link.

8. The system of claim 7, wherein the one or more processors are configured to locate a network link for augmentation by comparing the cumulative demand capacity of a link to the current network capacity of the physical link.

9. The system of claim 8, wherein the one or more processors are configured to calculate an amount of networking bandwidth to augment the current network capacity of the located network link.

10. The system of claim 7, wherein the first and second demand capacities are network bandwidth capacities based on forecasted network bandwidth use.

11. The system of claim 7, wherein identifying the first subset of links involves executing a shortest path algorithm selected from the group consisting of Dijkstra's algorithm, Bellman-Ford algorithm, and Floyd-Warshall algorithm.

12. The system of claim 7, wherein identifying the first subset of links includes:
using a data structure having a plurality of nodes and plurality of edges, at least one edge corresponding to a physical network link; and
modifying the data structure to remove each edge corresponding to the first subset of links.

* * * * *